June 21, 1938.  H. P. KNOBLE  2,121,203
PROTECTION TICKET
Original Filed June 7, 1937
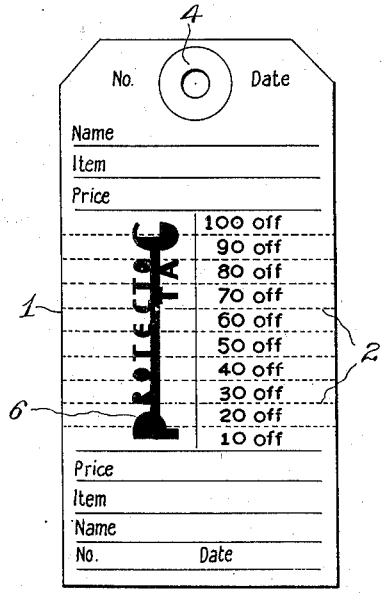
FIG. 1.
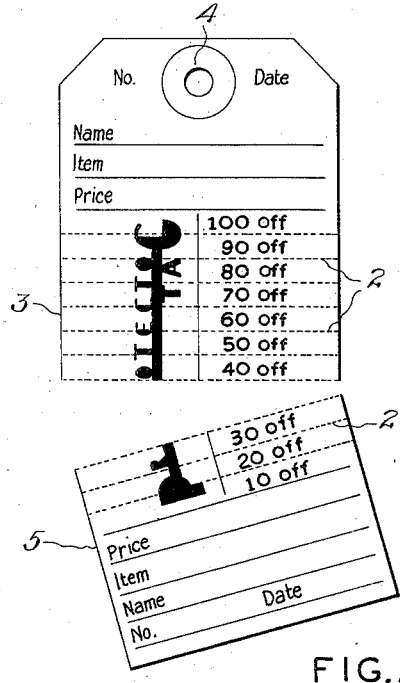
FIG. 2
FIG. 3.
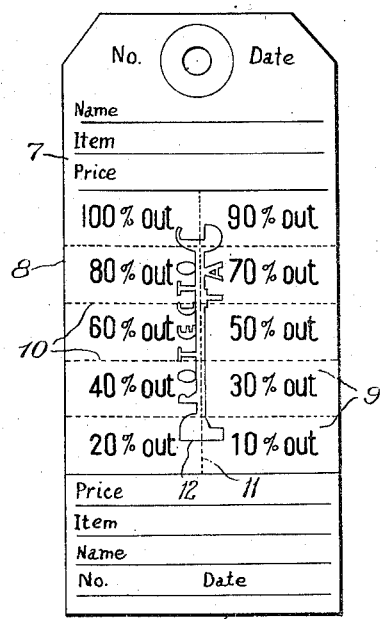
INVENTOR.
HERMAN P. KNOBLE
BY
ATTORNEY.

Patented June 21, 1938

2,121,203

UNITED STATES PATENT OFFICE 2,121,203

PROTECTION TICKET

Herman P. Knoble, Cleveland, Ohio

Application June 7, 1937, Serial No. 146,821
Renewed May 16, 1938

2 Claims. (Cl. 283—18)

My invention pertains to a protection ticket to be sold as a unitary structure to a producer, say, of flowers, from a central agency or clearing office of a national association or direct by the makers of the ticket and then attached by the producer, of the product to be sold, to a predetermined standard unit of trade. Thereafter, applicated identifying entries are made thereon by the grower. These entries are to establish the starting or final basis of the selling price of the different units, and to aid the wholesaler or commission man in trying to sell the producer's product for him, to a third party (a retail merchant) at a price satisfactory to the retailer and to the wholesaler, and definitely to let the producer know what this final price was. The entries will appear in blank spaces near opposite edges and in between such entered data the ticket is supplied with a sequential or graduated row of indicia and also with score lines extending between the latter whereby to facilitate selectable separation of the ticket into two parts along that particular score line which evidences the discount basis or terms of a mutually understood transaction as between the wholesaler and the retailer. The wholesaler retains the lower one of the separated sections of the ticket to serve as his record of the business transaction pertaining to the commodity unit which he sold to the retailer, and when making reports to his grower or producer returns the separated lower section to the consigning producer who agreeably had no share in the determination of the final selling price, but who subsequently desires the knowledge of it and of other identifying data which his returned section of the ticket supplies. The returned ticket section serves the producer as a coupon or voucher which in a subsequent comparative checking procedure and balancing of account definitely and irrevocably establishes and fixes the actual selling price obtaining for the particular transaction as determined at the place of agreement between the wholesaler and the retailer. This ticket also makes it possible to trace the agreed conclusion of a transaction against inconsistent irregularities sometimes committed by some who are engaged in any specific trade of selling someone else's product on a commission and returning to the producer the net moneys less than the original list price after commission has been deducted. Ordinarily this final reference of the severed lower stub of the ticket to an arbiter will not need to occur, yet it is always available for checking to terminate any dispute.

The origination is applicable to many industries, especially to those involving perishable or deteriorative commodities, but one part of the succeeding description and the drawing exemplify its adaption to the floral industry with which I have been actively associated for decades. The other part of the disclosure pertains to licensed liquor sales.

The complete protecting ticket may have a blank space at its top and also at its bottom, for duplicated entry by the producer of; a registry or serial number, a date, a grower's or a producer's name, a floral item of trade optionally also its style, quantity and quality and the established or approximated list price, then between its opposite marginal blank spaces a column of progressive percentage indicia. When the wholesaler offers the producer's stock for sale to a retailer and the latter is not satisfied with the price listed thereon by the producer, the wholesaler has the right, if he thinks necessary, to offer the retailer a discount. Supposing that the agreed discount is 30% less than the listed price, the wholesaler cuts off the tag at the point above 30% off, and gives this discount to the retailer, but returns the cutoff portion to the grower, so that the latter knows that this discount was actually given. As additional insurance, the paper of which the tickets are made will be of peculiar, inimitable manufacture, to comprise a series of pulp layers preferably of different color with at least one layer fashioned with a duplicated arrangement of indented or perforated designs, for example, of a trade-mark, with said designs of a size suitable for appearance in whole or in part wherever a separation of the ticket into two parts may have occurred and on one or both sides of each blank space section. Optionally a transparent, preserving coating for the paper may be applied on one or both sides of the ticket.

My invention has been to produce a piece of discouragingly imitable protection paper applicable for use either as a label or tag, the paper stock being of peculiar manufacture and the article made therefrom additionally of distinctive formation with appropriate printing thereon. While the ticket form contemplated for the floral industry is to be divided into only two parts for segregated intervening use and eventual checking comparison, the tag to be attached to a liquor bottle will have a larger number of separable units for progressive detachment and they are to be marked "10% out", "20% out" and so on and removed when and according to the measure that the contents of the bottle becomes diminished so that the remainder designated on the bottle attached tag portion corresponds with the level of the liquor remaining in the bottle. The indicated graduation scale may obviously be varied to suit the most common individual demand. My plan contemplates later integral incorporataion of a graduation scale in the wall of the bottle and in correspondence with the detachable percentage units of the tag to be carried by each bottle. Such an application is calculated to be a reliable yet far cheaper insurance against refilling of a bottle with an inferior product.

Adverting to the drawing,—

Fig. 1 is a plan view of the front side of the finished ticket embodying my invention.

Fig. 2 is a view of the divided ticket to form the tag and coupon portions.

Fig. 3 is a plan view of a modification to be used as a liquor-dispensing tag.

It is to be realized that the scope of my invention comprehends equivalent constructions. The showing of the drawing and the particular descriptions are merely specific exemplifications of a plurality of structural embodiments and arrangements within the scope of the appended claims.

Each individual upper-eyeletted ticket 1, as appears in Figure 1, is supplied at the top of its front side with five printed entry designations, which are: "No.", "Date", "Name", "Item", and "Price". The same five entry designations are caused to appear on the front side through at the bottom of each ticket in reverse order because each ticket sold and used may ultimately be divided into upper and lower parts in a manner and for the reason to be next explained.

Between the five duplicated top and bottom entry designations each ticket has printed thereon a sequential column of selectable discount indicia. As exemplified, the column of percentage discounts comprises a sequence of ten commencing with "10 off" at the bottom of the column and progressively increasing each by the numeral ten to end with "100 off" at the top. Between each pair in the column of percentage discounts the ticket is scored crosswise to the direction of extent of the column and from one side of the ticket to the other. Such score lines are all designated by the reference numeral 2. The purpose of a ticket such as has been described is to make possible an accurate and reliable approach to the double entry system and to facilitate selectable division of any particular ticket in commercial use to suit the transaction to be binding upon the producer of a commodity and the wholesaler or commission man to insure their mutual protection. For instance, when the producer of a growth of roses delivers a certain number thereof to a wholesaler, dealer or commission merchant he cannot be as certain of the demand, prevailing price range or condition of existing quality, especially of perishable or deteriorative commodities of trade, as can be the party who effects a sales transfer to a retailer from whom the goods pass to the ultimate consumer in a comparatively shorter time. The producer is content to permit the wholesaler to change the pre-determined price which the producer has affixed and which he shall receive from the wholesaler less an agreed commission, knowing that the latter is subject to adequate incentive to obtain the highest possible price from a retailer, but he is rightly concerned about obtaining verifiable knowledge of the discount terms which the dealer, in exercise of his accorded privilege, has elected to allow.

Accordingly, on the supposition that a wholesaler has determined to sell at "30 off" some particular lot of flowers or plants, he will tear the ticket apart along the score line above "30 off". The upper portion of the ticket serves as a tag and is to be secured through its eyelet to the item of sale by a cord or wire. The lower portion of the ticket will be returned to the producer whom it serves as a checking coupon 5. The fact that "30 off" appears at the top of such severed coupon 5 as appears in Figure 2 evidences to the producer that the wholesaler or commission merchant granted a 30 percent discount on the identified item.

When the wholesaler or commission man has a buyer who would buy a product, but at a reduced price than the producer attached, this ticket permits a modified price contracted between the former in behalf of the producer, and the latter. Though the producer is absent and not a direct party to the agreement either for the initial price he quoted or for some reduced price, the producer will be satisfied because his comparison of duplicate-entry parts of any particular ticket will permit of his verification. Thereby my invention becomes a price stabilizer. Hitherto, there was no way to prove the actual price at which the product was sold, and there was opportunity to report the sale at a much lower price than actually had taken place. This promotes attainment of "No bottom", in selling perishable products and perishable product industries are in particular need of "protection" in their marketing because the price of the product is determined at the point of sale between the buyer and the wholesaler or commission man. This I learned from thirty years experience in the florist business, and it has been confirmed by the fruit and vegetable producers.

The front of each ticket bears a protective indicia 6 which appears as a large showing of the trade-mark word "ProTecToTaG" extending parallel to the columnar sequential indicia with all the crosswise lines of scoring bisecting the same whereby to guarantee subsequent matching of the tag and coupon parts at a line of scoring previously selected for the separation of the coupon from the tag.

The modification of my separable ticket origination is disclosed in Figure 3 as applicable to the dispensation in retail sale from liquor bottles. A bottle initially and only once to contain a standard brand of liquor is marked integrally with graduations, in stages of ten commencing at the top and ending with numeral "100" at the bottom. The graduations are to be so disposed along the wall of the bottle that when the level of the liquid is substantially at the graduation line marked "10" which latter is of course to denote ten percent, ten percent of the original contents will have been poured out, supposedly as a legitimate sale for value received. To the bottle will be attached a ticket 7 embodying the modification of my invention and adapted to serve a progressive function. As each sale of a normal quantity reduces the contents to the next line, say, at 20%, the seller is to detach some part of the continuing tag portion 8, which will bear an appropriate notice or instruction, one of the ten small rectangular coupons 9 to correspond with the lowered level of the contents of the bottle. The coupons are exemplifiedly arranged as two columns and are delineated by parallel crosswise-extending score lines 10, a side edge and a longitudinal score line 11 which intersects the middle of each of the score lines 10. Extending between the columns so as to extend across all of the score lines 10 and across the score line 11 and therefore be printed in part on each coupon is the protecting symbol consisting of the word "ProTecToTaG" which is designated by the numeral 12. Initially, which is to say, at the time of selling enough liquor to lower by ten percent the contents of the bottle, the lower consumer identifying ticket 7', corresponding to the ticket 5 of Figures 1 and 2, and the "10% out" coupon will be detached and either destroyed or offered to the consumer for retention or destruction or torn by the seller in the presence of the consumer. Whatever happens to the successively detached coupons is of little importance because they are valueless when detached. With each subsequent sale of another ten percent or more of the contents a corresponding coupon percentage is to be progressively detached and torn. By this means a very simple and yet effective insurance is provided whereby the consumer will know that the bottle could not have been refilled in whole or in part to a level above that shown by the coupon of lowest denomination which is still attached to the bottle which latter should, of course, indicate an agreement with the liquid level on the graduated bottle scale. Since it is intended that it will become a legal requirement for liquor bottles to be so labeled as evidence of the authenticity of the contents in agreement with the brand carried by the bottle and moreover, since it is contemplated that such labels must be purchased and attached in compliance with the law, a consumer will be protected in the knowledge that he is to drink the brand which he desires and is being served the quality for which he is prepared to pay.

The ticket to be known as a "ProTecToTaG" is made of noncounterfeitable paper stock, in the form of a shipping tag. It is a device that is intended to be attached to any product by its maker, to identify this product, wherever it may be, as the genuine product of the maker and to be used as a price tag on which the maker of the product proposes such price as he wishes his product to bring to him. However, when the product is sold through a middleman, such as a wholesaler or commission merchant, and the final selling price is contracted with the buyer as a third party at the point of sale (which price may be lower than the pre-determined price attached by the maker or producer), and the commissionman agrees upon such a different price than that which was listed by the producer or maker—this device provides for a series of discounts which may be given to the buyer from the original price, but makes it possible for the producer of the article to know what the allowed discount was—because the commissionman must cut off this discount from the "ProTecToTaG" and return it to the producer.

This ticket is a re-assurance medium for an absent or remote producer and a verification of the dealing by a commissionman or seller of a producer's product either to maintain or change the price attached to his product by the maker, and yet notifies the maker exactly and truly of the changes. It becomes a stabilizer of prices because when the commissionman receives a commission for selling a maker's product, obviously, he is interested in obtaining the nearest possible price to that which the owner establishes. It identifies a maker's product as genuine or as his own. When modified and attached to containers of liquids, it can continue to identify those liquids as long as portions of the device are removed to correspond with an equal percentage of reduction in the contents of the container, so that when the contents are consumed, the use of the device must terminate.

Starting with the grower—the grower is about ready to market one unit of say twenty-five roses with stems 15 inches long. He would first put his number in the proper place, assuming it is "750", and the date, "2/12/36", name of grower, "Phil. Price", item, "one bunch 15", roses, price "$1.50," (assuming a normal market). At the bottom of the tag, the above record would be reproduced. Assuming that this was all the grower numbered 750 marketed or delivered in the commission house on the morning of 2/12/36, he would send along an invoice, and if he had taken to market 100 bunches, he would invoice as follows: The Wholesaler, 100 bunches 15 inch, roses, $1.50 per bunch, total $150.00.

At this point, it is well to visualize that no matter what the grower produces, he attaches the price on the "ProTecToTaG" that that unit calls for, being guided by his knowledge of cost of production plus a profit.

Considering next the wholesaler who in the early morning rush sells 75 bunches of the 15 inch roses at $1.50 a bunch, and then takes them to the various florists who bought them, leaving the "ProTecToTaG" attached to the bunch, complete as it came from the grower, which is going to the retailer.

The wholesaler is unable to sell the other 25 bunches, but a later buyer buys 10 bunches of the same species of 15 inch roses, who says he can use that many providing he can get a discount of 20 off, so the wholesaler allows this 20% reduction on the price of $1.50, selling the roses at $1.20 a bunch. When the wholesaler does this, he invoices them to his retail customer and cuts off the "ProTecToTaG" from one side to the other, just above 20 off and deposits that in a suitable container which he has in his place of business. Supposing that there is no further demand for the sale of the 15 bunches of the same kind of roses, but just before closing in the afternoon, a retail florist comes in and says he can use those 15 bunches at a discount of 50 off. The wholesaler, realizing that business is normal, or perhaps a little under normal, and expecting again a lot of roses from this or another consigner the next day, decides that if this purchase is not intended to stock up this retailer for the next day, but to be used for some special occasion that night, says, "All right, I'll give you a discount of 50% as you request," and so he invoices the 15 bunches of roses at $1.50 a bunch or $22.50 less 50% discount, $11.25, making the invoice read $11.25. He then cuts off the 15 tags above 50 off and deposits these cutoff tags in the container provided for that purpose, leaving the remaining portion of the tag in all cases, on the article as originally attached by the grower, and going on to the retailer.

My invention frustrates counterfeiting except at prohibitive expense. This is very important. A grower might like to have a corner printer print them for him at a fraction of the cost, and thereby attempt to do some "chiseling" by sending his product out through other than the accepted "wholesale channels", perhaps going direct to the retailer.

Many a grower's product, as now marketed, comes into the category of any other grower's. Sometimes his high-grade product is used to equalize or bring up the price on a lower grade of product of another grower, because the wholesaler will, in his ambition to "clean house", bunch 2 or 3 lots together.

This is certainly most unfair to the grower of the high-grade product, and is encouraging the grower of the poorer product to continue to produce that kind of a product, therefore the need for identifying the product becomes very serious in marketing flowers.

Whenever a wholesaler cannot return a tag, he must pay for it in full, as the grower invoiced that shipment. His only deviation from that is when he cuts off a part of the tag, allowing the discount, and then if he is to obtain credit for that, he returns the cutoff portion to the grower, and in case that the product is not sold, he returns the entire tag together with such evidence of the product as will convince the grower that the product was not sold. In all instances, that evidence should be the heads of the flowers.

With the tag, the grower says, as his product leaves the greenhouse, "This is worth according to my idea of the market conditions (for instance, the weather, plus information that I gathered from the general market, or my wholesaler) about 75 cents a bunch." He may be perfectly right, but as explained in the case of the roses, the first 50 or 60 bunches will sell that way, but by the time the rest are "pawed over", by the 80% buyer, the rest of them will have to be sold at some discount before the day is over, and the ProTecToTaG provides for the method of doing this, and provides a system of doing it honorably so that the wholesaler can feel that he is not looked upon as one who is constantly "chiseling in" on the grower's income, and because the wholesaler's income is predicted say, upon 15% of the selling price one may be sure that he will ask as near the marked price of the product as it is possible for him to get. The upper portion of the ticket remains on the unit to which it was attached by the producer, showing the buyer that that particular item was sold at a discount of 30% from its list price attached by the producer.

The ticket to be known as a "ProTecToTaG", is to be made of inimitable paper composed of several (preferably five) layers of different colored paper. Such a paper can be made only in a "paper mill" operation, therefore making it impossible to reproduce except in a similar "paper mill" operation, and therefore not cheaply nor easily counterfeited. Moreover, that contemplated make of paper will be so perforated in an outer layer as to reproduce as a staggered arrangement the repeated word "ProTecToTaG". After this paper is completed at the mill in this manner, it is again subjected to another process of printing the word "ProTecToTaG" in a complete over-all pattern, and in a staggered manner, and may be coated over with a transparent coating, also in a "paper mill" operation, making the paper still more difficult to reproduce or counterfeit.

The United States Government might wisely adopt the liquor tag modification as the carrying unit of its revenue-tax stamp with the revenue stamp an initial part of the paper stock and thereafter fabricating the stock into tickets. This would insure three very definite purposes: 1st, the United States Government would get all the tax or revenue on all distilled spirits produced and distributed. 2nd, the producer of the distilled spirits would know that his bottles were not filled with some other, or inferior distilled spirits—therefore giving the distiller the incentive to produce a fine product, knowing that what he labels will be his genuine product, and what he spends money for to advertise will be sold instead of some other product to the benefit of others, and 3rd, the consumer will be getting the product that he wished to use—the product that he is prepared to pay for.

This application is to be considered as a continuation in part of my application with the same title which was filed on Feb. 12, 1936 and which bore Serial No. 63,535.

I claim:—

1. In combination, a protection tag to be applied to goods sold and a coupon detachable from the tag, the tag and coupon having appropriately designated spaces on the obverse faces thereof for duplicated identifying notations, adjacent portions of the tag and coupon having columnar sequential discount indicia thereon with a line of scoring between each unit of discount indicia for the detachment of the coupon from the tag at a selected line of scoring, and protective indicia extending parallel to the columnar indicia with the lines of scoring bisecting the same for the subsequent matching of the tag and the coupon parts at a line of scoring previously selected for the separation of the coupon from the tag.

2. The combination as in claim 1, with the tag and coupon having parallel columns of the sequential discount indicia separated by a line of the scoring at right angles to the lines of the scoring between each unit of the discount indicia in the columns and with the protective indicia positioned commonly to the several lines of scoring.

HERMAN P. KNOBLE.